(12) United States Patent
Bäbler

(10) Patent No.: US 6,902,613 B2
(45) Date of Patent: Jun. 7, 2005

(54) PREPARATION AND USE OF NANOSIZE PIGMENT COMPOSITIONS

(75) Inventor: Fridolin Bäbler, Teresópolis (BR)

(73) Assignee: Ciba Specialty Chemicals Corporation

( * ) Notice: Subject to any disclaimer, the term of this patent is extended or adjusted under 35 U.S.C. 154(b) by 0 days.

(21) Appl. No.: 10/714,270

(22) Filed: Nov. 14, 2003

(65) Prior Publication Data

US 2004/0138349 A1 Jul. 15, 2004

Related U.S. Application Data

(60) Provisional application No. 60/430,522, filed on Nov. 27, 2002.

(51) Int. Cl.$^7$ ............................. C08K 5/00; C08K 5/34; C09B 67/00; C09B 67/20
(52) U.S. Cl. ..................... 106/493; 106/413; 106/494; 106/495; 106/496; 106/497; 106/498; 106/499; 106/503
(58) Field of Search ................................ 106/413, 493, 106/494, 495, 496, 497, 498, 499, 503, 412

(56) References Cited

U.S. PATENT DOCUMENTS

| | | | | |
|---|---|---|---|---|
| 2,213,693 A | * | 9/1940 | Davies et al. | 106/413 |
| 2,751,369 A | * | 6/1956 | Te Grotenhuis | 523/203 |
| 3,002,939 A | * | 10/1961 | Balassa | 8/553 |
| 3,607,336 A | | 9/1971 | Jaffe | 106/288 |
| 3,713,857 A | | 1/1973 | Shapiro | 106/288 |
| 3,826,670 A | * | 7/1974 | Rees | 523/204 |
| 4,810,304 A | | 3/1989 | Jaffe et al. | 106/494 |
| 5,679,138 A | | 10/1997 | Bishop et al. | 106/20 |
| 6,143,807 A | * | 11/2000 | Lin et al. | 523/161 |
| 6,225,472 B1 | | 5/2001 | Bäbler | 546/49 |
| 6,264,733 B1 | | 7/2001 | Bäbler | 106/495 |
| 6,406,533 B2 | | 6/2002 | Bäbler | 106/495 |
| 6,537,364 B2 | | 3/2003 | Dietz et al. | 106/493 |
| 6,786,965 B2 | * | 9/2004 | Perry et al. | 106/491 |

FOREIGN PATENT DOCUMENTS

| | | |
|---|---|---|
| GB | 475882 | 11/1937 |
| GB | 547411 | 8/1942 |
| GB | 945675 | 1/1964 |

OTHER PUBLICATIONS

B. R. Hsieh et al, Journal of Imaging Science and Technology, vol. 45 (1), pp. 37–42, "organic Pigment Nanoparticle Thin Film Devices via Lewis Acid Pigment Solubilization and In Situ Pigment Dispersions" (Jan./Feb. 2001).

* cited by examiner

Primary Examiner—Anthony J. Green
(74) Attorney, Agent, or Firm—Shiela A. Loggins

(57) ABSTRACT

A mixture of an organic nanosize pigment comprising of from 50 to 99% by weight of the nanosize pigment and 1 to 50% by weight based of a low molecular weight naphthalene sulfonic acid formaldehyde polymer and its use as a particle growth and crystal phase director for the preparation of a direct pigmentary organic pigment or in pigment finishing.

13 Claims, 2 Drawing Sheets

PREPARATION AND USE OF NANOSIZE PIGMENT COMPOSITIONS

This application claims the benefit under 35 U.S.C. 119(e) of U.S. Provisional Application No. 60/430,522, Filed Nov. 27, 2002.

FIELD OF INVENTION

The present invention relates to a novel method for the preparation of organic nanosize pigments and their use for example as additives to direct and control the growth and/or crystal phase of pigment particles. Such compounds are particularly useful when present during the synthesis or finishing of an organic pigment.

BACKGROUND OF THE INVENTION

Organic pigment nanoparticle thin film devices via Lewis acid pigment solubilization and in situ pigment dispersions are described by Hsieh, B. R.; Melnyk, A. R., Xerox Corporation, Webster, N.Y., U.S.A., in the Journal of Imaging Science and Technology 45(1), 37–42 [2001].

A number of patents describe processes for the preparation of nanosize pigments. For example, U.S. Pat. No. 5,679,138 describes a process for the preparation of ink jet inks comprising pigments with a pigment particle size of less than 100 nanometers prepared by milling the corresponding pigments in a high speed mill and its use for ink jet printers. EP-1,195,413 describes the production of finely divided organic pigments by precipitation in a micro jet reactor, with the resulting pigment suspension being removed by a gas or vaporized liquid. An example is given which provided copper tetrachloro phthalocyanine having an average partide size of 26±11 nm.

U.S. Pat. No. 6,225,472 and U.S. Pat. No. 6,406,533 describe 6,13-dihydroquinacridone derivatives that can direct and control the growth and/or crystal phase of pigment partides.

U.S. Pat. No. 6,264,733 describes new pigment particle growth and/or crystal phase directors of formula $(MO_3S)_m$-$Q$-$(CH_2$—$(X)$—$(Y)_n)_o$(I), wherein Q represents a pigment moiety, M represents a metal cation, quatemary N cation or H, X is a aromatic group or a cyclo-hetero aliphatic group with at least one 5 atom or 6 atom ring or a hetero aromatic group with at least one 6 atom ring and which is not a phthalimido group, Y is a sulfonic acid or carboxylic acid or salt thereof; m and n independent of each other represent an integer from zero to 2.5; and o is an integer from 0.05 to 4.

Although such compounds can effectively direct the growth and crystal phase of pigment particles when present during the pigment synthesis, they have the disadvantage of being a pigment derivative and therefore need to be separately synthesized first and are subject to additional regulatory clearances.

The state of the art literature does not describe the use of nanosize pigment particles to induce pigment crystal growth or as crystal phase directors during pigment synthesis or pigment finishing.

SUMMARY OF THE INVENTION

Figure 1:
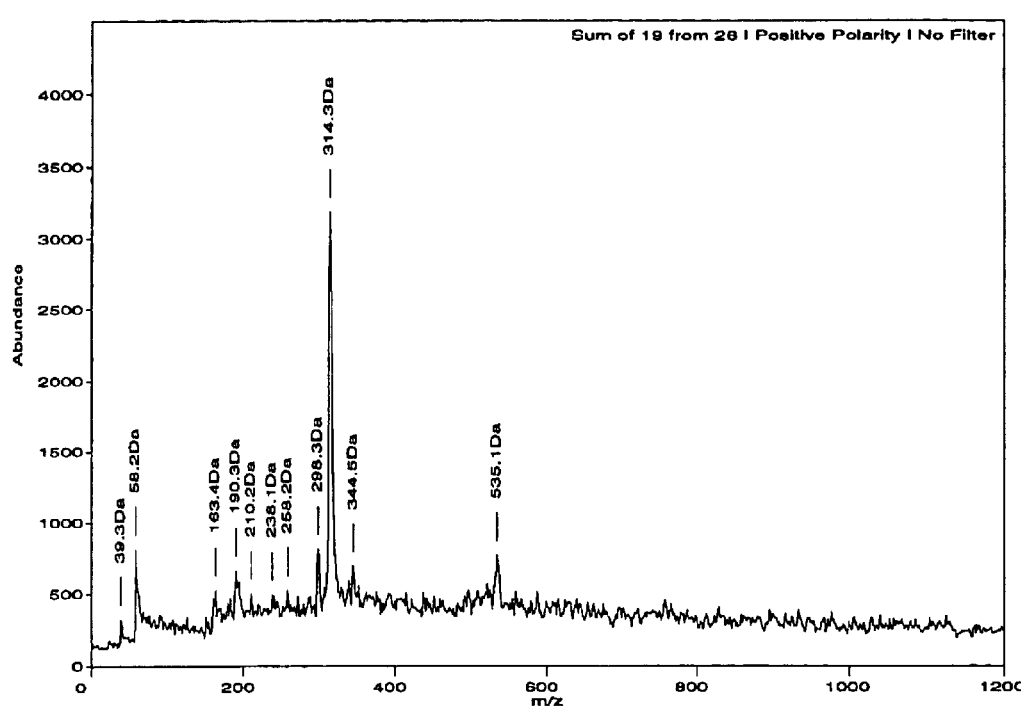
FIG. 1. Matrix Assisted Laser Desorption/Ionization (MALDI) spectrum, positive mode, of the pigment of Example 1 showing as the main component quinacridone (m/z 314 peak), and only a trace of naphthalene sulfonic acid methyl quinacridone (m/z 535 peak).

It has now surprisingly been found that organic pigments in a nanosized particle form that is stabilized by low molecular weight naphthalene sulfonic acid formaldehyde polymers can be used effectively as crystal growth and crystal phase directors when present during the pigment synthesis or a pigment finishing step. They are particularly effective for quinacridone and diketopyrrolo pyrrole pigments.

Such nanosize pigment particles can be prepared by routine synthesis procedures and offer the pigment manufacturer an efficient means to prepare a pigment having the preferred color characteristic without requiring an additional pigment finishing step.

Thus, the inventive process allows the manufacturer to produce high performance, high chroma organic pigments in an economical and environmentally friendly manner and therefore, is of significant commercial importance.

DETAILED DESCRIPTION OF THE INVENTION

The present invention relates to a method for the preparation of organic pigments in a nanosize pigment particle size by dissolving the organic pigment in an acid and precipitation from the acidic solution in the presence of a low molecular weight naphthalene sulfonic acid formaldehyde polymer into a liquid, which is preferably water. The resulting suspension is filtered and the presscake consists of the polymer and the pigment in a nanosize pigment particle form. It can, for example, be used "as is" in the acidic wet form, or can be reslurried in water or an organic solvent to provide a dispersion containing nanosized pigment particles.

Furthermore the present invention relates to the use of such nanosized pigment/naphthalene sulfonic acid formaldehyde polymer mixtures as crystal growth and crystal phase directors when present during the pigment synthesis or a pigment finishing step, Suitable organic pigments include organic pigments selected from the group consisting of azo, azomethine, methine, anthraquinone, phthalocyanine, perinone, perylene, diketopyrrolopyrrole, thioindigo, thiazinindigo, dioxazine, iminoisoindoline, iminoisoindolinone, quinacridone, flavanthrone, indanthrone, anthrapyrimidine and quinophthalone pigments, or a mixture or solid solution thereof; especially a dioxazine, diketopyrrolopyrrole, quinacridone, phthalocyanine, indanthrone or iminoisoindolinone pigment, or a mixture or solid solution thereof.

Preferred organic pigments are the quinacridone, anthraquinone, phthalocyanine, perylene, dioxazine, iminoisoindolinone, iminoisoindoline, diketopyrrolopyrrole and indanthrone pigments.

Highly preferred are quinacridone pigments of formula

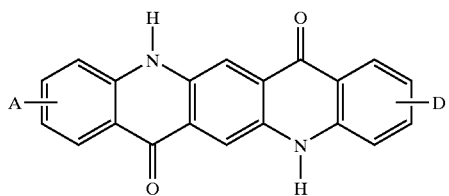

wherein A and D are independently of one another H, F, Cl, $C_1$–$C_3$alkyl or $C_1$–$C_3$alkoxy.

The instant process is especially useful for the preparation of nanosized particles of quinacridone, 2,9-dichloroquinacridone, 2,9-difluoroquinacridone, 4,11-dichloroquinacridone, 2,9-dimethyl-quinacridone and 2,9-dimethoxyquinacridone.

Additionally, the process is also suitable for the preparation of solid solutions in a nanosized particle form containing one or more quinacridone components. Thus, an aspect of this invention relates to the process wherein a mixture containing two or more quinacridones of formula (I) are co-precipitated by the inventive process to yield a quinacridone solid solution product.

The process of this invention is particularly practical for the preparation of solid solution pigments in a nanosized particle form, such as quinacridone/2,9-dichloroquinacridone, quinacridone/4,11-dichloroquinacridone, quinacridone/2,9-dimethylquinacridone, quinacridone/2,9-dimethoxyquinacridone, 2,9-dichloroquinacridone/2,9-dimethylquinacridone, 2,9-dichloroquinacridone/2,9-dimethoxyquinacridone, 2,9-dimethylquinacridone/2,9-dimethoxyquinacridone, quinacridone quinone/quinacridone, 6,13-dihydroquinacridone/quinacridone or quinacridone/diketopyrrolopyrrole solid solutions as described for example in U.S. Pat. No. 4,810,304.

The low molecular weight naphthalene sulfonic acid polymer according to this invention has a molecular weight below 10000 and is preferably represented by formula

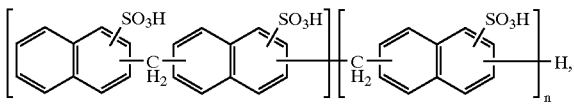

wherein n is a number from 0 to 12, preferably from 1 to 5. Correspondingly, the average molecular weight is about from 400 to 3000, preferably from 648 to 1532.

The naphthalene sulfonic acid is 1- or 2-naphthalene sulfonic acid or preferably a mixture of the 1- and 2-naphthalene sulfonic acids. Most preferably, the inventive naphthalene sulfonic acid formaldehyde polymer is prepared from a mixture of 1-naphthalene sulfonic acid and 2-naphthalene sulfonic acid in a molar ratio of about 4:1.

The above naphthalene sulfonic acid formaldehyde polymer is added to the pigment at a concentration of from 1 to 50% by weight, preferably from 10 to 45% by weight, based on the final pigment/polymer mixture. It can be prepared separately and then be added before or during the precipitation process of the pigment. Preferably, the naphthalene sulfonic acid formaldehyde polymer is prepared after dissolving the pigment, thus in the presence of the pigment, in the acid media.

The nanosized pigments are prepared for example by a process in which the pigment is dissolved preferably in a mineral acid such as sulfuric acid or phosphoric acid. Then naphthalene sulfonic acid and formaldehyde are added preferably in a 1:1 molar ratio, which react to generate the inventive naphthalene sulfonic acid formaldehyde polymer followed by precipitation of the pigment/polymer mixture into a precipitation medium.

The precipitation medium is preferably water. Organic solvents, preferably water-soluble organic solvents such as for example a $C_1$ to $C_5$ alcohol like methanol, ethanol, ethylene glycol, ethylene glycol mono-$C_1$–$C_3$alkyl ether, n-propanol, isopropanol, n-butanol or tert-amyl alcohol or a mixture of organic solvents can be present in the precipitation media in such concentration that there is no negative impact on the generation of the inventive nanosize pigments.

Additionally, it can be advantageous to neutralize the acid partially or completely during or after the precipitation process. Neutralizing agents are for example ammonia or organic amines or preferably the alkali hydroxides like aqueous sodium or potassium hydroxides.

Furthermore it is possible to add additives such as surfactants, antifoaming agents, inorganic fillers such as talc or mica, UV-absorber, light stabilizers like hindered amines, resins or waxes before, during or after the inventive precipitation process. The amount of the additives is 0 to 40% by weight, preferably 0.1 to 20% by weight based on the amount of the pigment.

Typically, the pigment, naphthalene sulfonic acid and formaldehyde are used in a 1:1:1 molar ratio. However more of the naphthalene sulfonic acid or formaldehyde may be used to achieve the inventive nanosize pigment particles in mixture with the desired polymeric product. Preferably, the molar ratio of the pigment:naphthalene sulfonic acid: formaldehyde is 1:1–1.2:1–2.

Advantageously, the reactions conditions are conducted in such a way that little sulfonation of the pigment is occurring. Therefore, the pigment is dissolved preferably at a temperature below 65° C., preferably at from 30 to 60° C., most preferably from 35 to 45° C., and the reaction is carried out preferably at a temperature below 100° C., most preferably at from 50 to 90° C.

Depending on the temperature and other reaction conditions like timing of the addition of naphthalene sulfonic acid and/or formaldehyde into the pigment/sulfuric acid mixture, some further sulfonation of the naphthalene sulfonic acid may occur, in particular to the naphthalene disulfonic acid. The presence of polymers containing such naphthalene disulfonic acid moieties is not prohibitive, as long they do not negatively impact the particle size and further properties of the inventive nanosize pigments.

In a preferred embodiment, the corresponding pigment is dissolved in concentrated (95–98%) sulfuric acid at a concentration of about 5 to 30% by weight, most preferably about 10 to 25% by weight at a temperature below about 50° C., preferably at about 35 to 45° C. The naphthalene sulfonic acid, preferably a mixture of 1-naphthalene sulfonic acid and 2-naphthalene sulfonic acid in a molar ratio of 4:1, is added to the pigment solution at a temperature below about 50° C., preferably at about 35 to 45° C. and is also dissolved. Finally, the formaldehyde is added, preferably in the form of para-formaldehyde, at a temperature below about 55° C., preferably at 35 to 50° C. The reaction mixture is heated to a temperature of from about 50 to 90° C. and stirred at that temperature until the reaction is complete, preferably for about 30 minutes to 6 hours, most preferably from about 30 to 90 minutes, and drowned into water having a temperature below 40° C., preferably below 25° C. or ice water. The slurry is stirred for about 5 minutes to 6 hours, preferably from about 30 minutes to 3 hours, at a temperature of from about 0 to 50° C., preferably of from 10 to 25° C. The inventive compounds are then isolated by filtration or centrifugation and can be used as is in its acidic presscake form or are washed to pH 4–7 with water. The resulting product cake can again be used as is or be reslurried in water or a solvent to provide nanosize pigment containing dispersions or it can be dried.

Generally, the present reaction conditions favor the generation of a pure nanosize pigment with the presence of only traces of the corresponding mono or di naphthalene sulfonic acid methyl pigment derivative of the formula

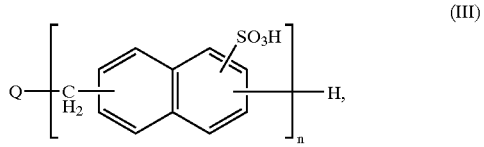

(III)

wherein n is 1 or 2 and Q is the radical obtainable by deprotonation of the pigment, usually by deprotonation of an OH or NH group.

However, the presence of such a derivative in a concentration of 0.01 to 10% by weight based on the inventive nanosize pigment can have an additional advantageous effect.

Any equipment can be used in which the precipitation from the acid solution provides the inventive nanosize pigments with their desired properties. For example it can be carried out in a micro reactor as described in published EP-1,195,413 or in a high turbulence drowning equipment as described in U.S. Pat. No. 3,607,336 or simply by drowning the sulfuric acid pigment/naphthalene sulfonic acid polymer solution into water or ice/water in a vessel.

The isolated samples can be analyzed by known methods, for example, by elementary analysis or mass spectrometry such as LCMS, GCMS or the matrix-assist d laser desorption ionization technique (MALDI) or by the HPLC method, all of which are well known to those of ordinary skill in the art. The particle size of the inventive nanosize pigment particles can be obtained by the electron micrograph.

Typically, the inventive nanosize pigments have an average particle size of from 1 to 100 nm, preferably from 1 to 50 nm and most preferably from 3 to 30 nm, as determined by the electron micrograph from an acidic aqueous dispersion.

Surprisingly, it was found that the inventive nanosize pigment/formaldehyde naphthalene sulfonic acid polymer mixtures could act as effective crystal growth and crystal phase directors when present during the pigment synthesis or a pigment finishing step.

Generally, the inventive nanosize pigment/naphthalene sulfonic acid formaldehyde polymer mixtures when used as particle growth and crystal phase directors are added at a concentration of up to about 25% by weight, preferably from 0.1 to 15% by weight, more preferably from 0.3 to 10% by weight and most preferably from 0.5 to 8% by weight, based on the pigment to be synthesized, before or during the final steps of pigment synthesis. The addition of pigment/naphthalene sulfonic acid formaldehyde polymer mixtures as particle growth and/or crystal phase directors has generally a negligible effect on the yield of the pigment to be synthesized.

The inventive nanosize pigment/naphthalene sulfonic acid formaldehyde polymer mixtures growth and/or crystal phase directors are suitable as additives for the synthesis of pigments of several pigment classes including pigments of the anthraquinone, phthalocyanine, perinone, perylene, diketopyrrolopyrrole, thiazinindigo, thioindigo, iminoisoindoline, iminoisoindolinone, quinacridone, flavanthrone, dioxazine, indanthrone, anthrapyrimidine and quinophthalone pigment classes.

The inventive nanosize pigment/naphthalene sulfonic acid formaldehyde polymer mixtures are particularly suitable for the synthesis of direct pigmentary grade diketo pyrrolopyrrole and quinacridones and/or its solid solutions. Said compounds are highly suitable for the synthesis of quinacridone pigments in their specific crystal modifications, such as the alpha, beta or gamma quinacridone, 2,9-dichloroquinacridone, 2,9-dimethyl-quinacridone, 4,11-dichloroquinacridone and solid solutions thereof.

Without limiting this invention to any particular theory, it is believed that the inventive nanosize pigment particles can act as seeds for the pigments to be synthesized and the low molecular weight naphthalene sulfonic acid formaldehyde polymer can adhere to the synthesized pigment molecule and by doing so can further direct the crystal growth and crystal phase. The term "directing the crystal growth" refers to controlling the synthesis of pigment particles to have a suitable pigmentary size as well as directing the growth of the crystals to generate particles of a specifically desired shape, such as platelet, needle, cubic, leaflet, prismatic and other geometric forms, in a desired crystal phase. The effect can be influenced by the chemical structure of the organic pigment, the selection of the reaction media and the concentration and chemical structure of the inventive particle growth director compounds. Hence, usually it is preferable to use nanosize seeds of the same pigment class and/or even same crystal phase as the desired pigment, most preferred identical to the desired pigment.

During the isolation of the pigment, for example in the filtration step, the polymer compounds—when soluble in the reaction media—can be washed out and if desirable, be recollected from the filtrate or wash liquid. Typically, traces of these compounds are partially left on the pigment surface and can have additional benefits. Such benefits are, for example, improved pigment properties such as rheological properties, dispersibility and wetting behavior, flocculation resistance and improved heat stability.

In certain cases, it is advantageous to use the inventive compounds in mixture or in combination with other additives including known pigment particle growth inhibitors such as, for example, phthalimidomethyl-, imidazolmethyl- or pyrazolmethyl-quinacridone, pigment sulfonic acids or specific polymers; or other optional ingredients such as wetting agents, surfactants, defoamers, antioxidants, UV absorbers, light stabilizers, plasticizers, or general texture improving agents and so forth. Any such additional additives may be used as long as said additives are stable under the pigment synthesis conditions and have no negative impact on the final pigment properties or the environment. Generally, such additives can be used in a concentration of about from 0.1 to 25% by weight, preferably from 0.2 to 15% by weight and most preferably from 0.5 to 8% by weight, based on the pigment to be synthesized.

Suitable specific polymers are, for example, polyacrylic acid, polymethacrylic acid, polyurethane, polyvinylalcohol, polyvinylpyrrolidone or cellulose derivatives.

Suitable surfactants include anionic surfactants such as alkylbenzene- or alkylnaphthalene-sulphonates, alkylsulfosuccinates or cationic surfactants including, for example, quaternary salts such as benzyl tributyl ammonium chloride; or nonionic or amphoteric surfactants such as polyoxyethylene surfactants and alkyl- or amidopropyl betaines, respectively.

Suitable texture improving agents are, for example, fatty acids such as lauric, stearic or behenic acid, and fatty amines such as laurylamine and stearylamine. In addition, fatty alcohols or ethoxylated fatty alcohols, polyols such as aliphatic 1,2-diols or epoxidized soybean oil, waxes, resin acids and resin acid salts may be used for this purpose.

Suitable UV stabilizers are, for example, the benzotriazole derivatives known under the trade names Tinuvin® or Ciba Fast® H Liquid (an aryl sulfonated benzotriazol), both being products of Ciba Specialty Chemicals Corporation.

Due to the ability to act as an antiflocculant as well as an excellent particle growth inhibitor and phase director, the inventive nanosize pigment/naphthalene sulfonic acid formaldehyde polymer mixtures can generally be used in the pigment finishing, pigment treatment, or pigment application such as an additive during the pigment dispersion step in bead mills, extruder, calander and so forth, as well as during pigment synthesis.

The inventive nanosize pigment/naphthalene sulfonic acid formaldehyde polymer mixtures are themselves strongly colored and can be used as coloring agents for the coloring of inorganic or organic substrates such as mineral oil, paints, inks, color filters, fibers, plastics, paper, cosmetics and textiles. Such applications are well-known per se, for example for colour filters from PCT/EP03/08654.

The following examples further describe some preferred embodiments of the invention, but do not limit the scope of the invention. In the examples, all parts are by weight unless otherwise indicated.

EXAMPLE 1

A one liter flask equipped with a stirrer, thermometer, condenser and drying tube is charged with 200 ml concentrated (95–98%) sulfuric acid. 31.2 g unsubstituted quinacridone (Cromophtal® Red 2020, Ciba Specialty Chemicals Inc.) are added at a temperature below 45° C. and the mixture is stirred for 10 minutes at 40–45° C. to dissolve the pigment.

39.7 g of a wet naphthalene sulfonic acid sodium salt presscake with a solid content of 58%, a mixture containing 80% 1-naphthalene sulfonic acid sodium salt and 20% 2-naphthalene sulfonic acid sodium salt (Shanghai Shen Li Chemical Factory) are added at a temperature below 45° C. and the mixture is stirred for 15 minutes at 40–45° C. followed by the rapid addition of 3.2 g para formaldehyde. The reaction mixture is stirred for one hour at 58–60° C. then poured into 2.5 l ice water. The violet precipitate is stirred for 1 hours at 5–20° C., then filtered. The violet press cake is washed with water to a pH of about 2.5 and kept as presscake.

About 0.5 g of the press cake are reslurried in 20 ml hot water yielding a red colored liquid which is filtered through paper to remove little aggregated material. The filtrate is red and appears like a dye solution. However, the electron micrograph shows the quinacridone in nanosize particle form with an average particle size of 10 to 25 nm.

A small sample of the violet presscake is further washed to a pH of 5 and dried and analytically tested by Matrix Assisted Laser Desorption/Ionization (MALDI). When measured in positive mode, it shows as main component quinacridone (m/z 314 peak), and only a trace of naphthalene sulfonic acid methyl quinacridone (m/z 535 peak) is found as shown in FIG. 1.

Figure 2:
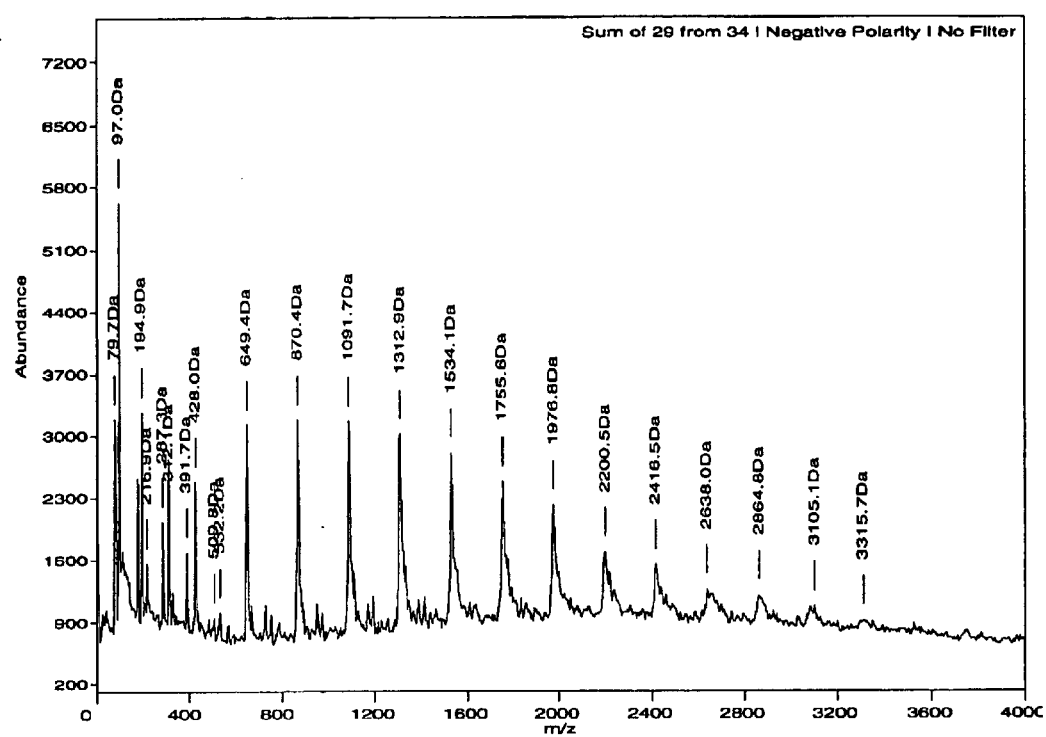
FIG. 2. MALDI spectrum. negativie mode, of the pigment of Example 1 showing again the quinacridone (m/z 312 peak) and the polymeric structure of the naphthalene sulfonic acid-formaldehyde polymer with the main molecular weight peaks at 428, 649, 870, 1091, 1312, 1534, 1755 and 1976.

When measured in negative mode, again the quinacridone is visible (m/z 312 peak) and the polymeric structure of the naphthalene sulfonic acid-formaldehyde polymer is clearly visible with the main molecular weight peaks at 428, 649, 870, 1091, 1312, 1534, 1755 and 1976. The negative mode MALDI spectrum is shown in FIG. 2.

EXAMPLE 2

A one-liter flask equipped with a stirrer, thermometer, condenser and drying tube is charged with 200 ml concentrated (95–98%) sulfuric acid. 17 g 2,9-dimethylquinacridone pigment (Cromophtal® Pink PT, Ciba Specialty Chemicals Inc.) is added at a temperature below 45° C. and the mixture is stirred for 10 minutes at 40–45° C. to completely dissolve the pigment.

19.9 g of a wet naphthalene sulfonic acid sodium salt presscake with a solid content of 58%, a mixture containing 80% 1-naphthalene sulfonic acid sodium salt and 20% 2-naphthalene sulfonic acid sodium salt (Shanghai Shen Li Chemical Factory) are added at a temperature below 45° C. and the mixture is stirred for 30 minutes at 40–45° C. followed by the rapid addition of 1.6 g para formaldehyde. The reaction mixture is stirred for one hour at 58–60° C. then poured into 2.5 liter ice water. The bluish violet precipitate is stirred for 1 hour at 5–20° C., and then filtered. The violet press cake is washed with water to a pH of 2–2.5 and kept as presscake.

About 0.5 g of the press cake are reslurried in 20 ml hot water yielding a magenta colored liquid which is filtered through paper to remove little aggregated material. The filtrate is magenta and appears like a dye solution. However, the electron micrograph shows the 2,9-dimethyl quinacridone in nanosize particle form with an average particle size of from 10 to 30 nm.

EXAMPLE 3

A one-liter flask equipped with a stirrer, thermometer, condenser and drying tube is charged with 150 ml concentrated (95–98%) sulfuric acid. 14 g 2,9-dimethoxyquinacridone are added at a temperature below 45° C. and the mixture is stirred for 10 minutes at 40–45° C. to completely dissolve the pigment.

15 g of a wet naphthalene sulfonic acid sodium salt presscake with a solid content of 58%, a mixture containing 80% 1-naphthalene sulfonic acid sodium salt and 20% 2-naphthalene sulfonic acid sodium salt (Shanghai Shen Li Chemical Factory) are added at a temperature below 45° C. and the mixture is stirred for 15 minutes at 40 to 45° C. followed by the rapid addition of 1.2 g paraformaldehyde. The reaction mixture is stirred for one hour at 58–60° C. then poured into 2.5 liter ice water. The bluish violet precipitate is stirred for 1 hours at 5–20° C., then filtered. The bluish violet press cake is washed with water to a pH of 2–2.5 and kept as presscake.

About 0.5 g of the press cake are reslurried in 20 ml hot water, yielding a bluish violet colored liquid which is filtered through paper to remove little aggregated material. The filtrate is bluish violet and appears like a dye solution. However, the electron micrograph shows the 2,9-dimethoxyquinacridone in nanosize particle form with an average particle size of from 10 to 30 nm.

EXAMPLE 4

A one-liter flask equipped with a stirrer, thermometer, condenser and drying tube is charged with 250 ml concentrated (95–98%) sulfuric acid. 19.5 g 2,9-dichloroquinacridone pigment (Cinquasia® Magenta RT-265-D, Ciba Specialty Chemicals Inc.) are added at a temperature of 50° C. and the mixture is stirred for 20 minutes at 48–52° C. to dissolve the pigment.

19.9 g of a wet naphthalene sulfonic acid sodium salt presscake with a solid content of 58%, a mixture containing 80% 1-naphthalene sulfonic acid sodium salt and 20% 2-naphthalene sulfonic acid sodium salt (Shanghai Shen Li Chemical Factory) are added at a temperature below 50° C. and the mixture is stirred for 30 minutes at 45–50° C. followed by the rapid addition of 1.6 g paraformaldehyde. The reaction mixture is stirred for one hour at 58–60° C. then poured into 2.5 liter ice water. The violet precipitate is stirred for 1 hour at 5–20° C., and then filtered. The violet press cake is washed with little water to a pH of 1.5–2.5 and kept as presscake.

About 0.5 g of the press cake are reslurried in 20 ml hot water, yielding a violet colored liquid which is filtered through paper to remove little aggregated material. The filtrate is violet and appears like a dye solution. However, the electron micrograph shows the 2,9-dichloroquinacridone in nanosize particle form with an average particle size of from 10 to 25 nm.

EXAMPLE 5

A one-liter flask equipped with a stirrer, thermometer, condenser and drying tube is charged with 200 ml concentrated (95–98%) sulfuric acid. 21.4 g C.I. Pigment Red 254 (Irgazin® DPP Red BO, CIBA Specialty Chemicals Inc.) is added and the mixture is stirred for 1 hour at 55–58° C.

23.9 g of a wet naphthalene sulfonic add sodium salt presscake with a solid content of 58%, a mixture containing 80% 1-naphthalene sulfonic acid sodium salt and 20% 2-naphthalene sulfonic acid sodium salt (Shanghai Shen Li Chemical Factory) are added at a temperature below 70° C. and the mixture is stirred for 10 minutes at 70° C. followed by the rapid addition of 1.9 g paraformaldehyde. The reaction mixture is stirred for one hour at 70–75° C., then poured into 2.7 liter ice water. The violet brownish precipitate is stirred for 1 hour at 5–20° C., then filtered. The press cake is washed with water to a pH of 2.0–3.0 and kept as presscake.

About 0.5 g of the press cake are reslurried in 20 ml hot water yielding a violet colored liquid which is filtered through paper to remove little aggregated material. The filtrate is brown and appears like a dye solution. However, the electron micrograph shows the diketopyrrolo pyrrole pigment in nanosize particle form with an average particle size of 10 to 30 nm.

EXAMPLE 6

A one-liter flask equipped with a stirrer, thermometer, condenser and drying tube is charged with 200 ml concentrated (95–98%) sulfuric acid. 15 g C.I. Pigment Blue 60 (Cibanon® Blue RS PT 9860, Ciba Specialty Chemicals Inc.) are added at a temperature below 45° C. and the mixture is stirred for 15 minutes at 40–45° C. to completely dissolve the pigment.

10.7 g of a wet naphthalene sulfonic acid sodium salt presscake with a solid content of 58%, a mixture containing 80% 1-naphthalene sulfonic acid sodium salt and 20% 2-naphthalene sulfonic acid sodium salt (Shanghai Shen Li Chemical Factory) are added at a temperature below 50° C. and the mixture is stirred for 10 minutes at 40–45° C. followed by the rapid addition of 1.6 g paraformaldehyde. The reaction mixture is stirred for one hour at 60–65° C. then poured into 2.5 liter ice water. The dark bluish precipitate is stirred for 1 hour at 5–20° C., and then filtered. The dark bluish press cake is washed with water to a pH of 1.5–3.0 and kept as presscake.

About 0.5 g of the press cake are reslurried in 20 ml hot water yielding a blue colored liquid which is filtered through paper to remove little aggregated material. The filtrate is blue and appears like a dye solution. However, the electron micrograph shows the indanthrone pigment in nanosize particle form with an average particle size of from 10 to 30 nm.

EXAMPLE 7

A one liter flask equipped with a thermometer, stirrer and condenser is charged with 50 g 6,13-dihydroquinacridone, 200 ml methanol, 1 g polyvinylpyrrolidone powder (Luviskol® K-30, BASF) and 7 g of the aqueous presscake of the nanosize quinacridone/naphthalene sulfonic acid formaldehyde polymer mixture according to Example 1 are stirred at 20–27° C. for 10 minutes. 50 g 50% aqueous sodium hydroxide are added. The mixture is stirred under a slow flow of nitrogen at 50–53° C. for one hour. 0.8 g anthraquinone mono sulfonic acid sodium salt as catalyst is added and the reaction mixture is heated to reflux for 10 minutes. 76 g of an aqueous 18.9% by weight hydrogen peroxide solution are added into the reaction mixture with a peristaltic pump at a pumping rate of 0.4 ml/minute, whereby after 25 minutes addition time 1.6 g phthalimidomethyl-quinacridone are introduced into the reaction mixture followed by continuing the hydrogen peroxide addition while maintaining reflux and a slow nitrogen flow. The resulting violet suspension is further stirred for 10 minutes at reflux then diluted with 100 ml cold water and filtered. The presscake is washed with hot water then dried, yielding a violet quinacridone.

The product shows a high purity and less then 0.1% remaining 6,13-dihydro-quinacridone as determined by a spectrophotometer method. The X-ray diffraction pattern of the pigment shows the characteristics of a beta quinacridone. When incorporated into automotive paints, the product leads to a strong violet color dispersion with excellent rheological properties and an attractive color appearance when drawn on a contrast carton, which dispersion can easily be sprayed on metallic panels generating coatings of excellent durability (a topcoat may then further be applied in conventional manner, for example by the wet-on-wet technique).

EXAMPLE 8

A one liter flask equipped with a thermometer, stirrer and condenser is charged with 50 g 6,13-dihydroquinacridone, 200 ml methanol, 1 g polyvinylpyrrolidone powder (Luviskol® K-30, BASF) and 7 g of the aqueous presscake of the nanosize quinacridone/naphthalene sulfonic acid formaldehyde polymer mixture according to Example 1, are stirred at 20–27° C. for 10 minutes. 73 g 50% aqueous sodium hydroxide are added. The mixture is stirred under a slow flow of nitrogen at 50–53° C. for 30 minutes. 4.6 g of a 37% aqueous solution of anthraquinone-2,7-disulfonic acid disodium salt as catalyst is added followed by 10 ml water and the reaction mixture is heated to reflux for 40 minutes. 79 g of an aqueous 18.2% by weight hydrogen peroxide solution are added into the reaction mixture with a peristaltic pump at a pumping rate of 0.4 ml/minute, whereby after 20 minutes addition time 2.3 g phthalimido methyl-quinacridone and after another 70 minutes 0.3 g phthalimidomethyl-quinacridone are introduced into the reaction mixture followed by continuing the hydrogen peroxide addition while maintaining reflux and a slow nitrogen flow. The resulting violet suspension is further stirred for 10 minutes at reflux then diluted with 100 ml cold water and filtered. The presscake is washed with hot water then dried, yielding a violet quinacridone.

The product shows a high purity and less then 0.1% remaining 6,13-dihydro-quinacridone as determined spectrophotometrically. The X-ray diffraction pattern of the pigment shows the characteristics of a beta quinacridone. When incorporated in automotive paints or plastics, the product leads to a strong violet color with excellent properties.

EXAMPLE 9

The procedure of Example 8 is repeated, but using 4 g of the aqueous presscake of the nanosize 2,9-dimethylquinacridone/naphthalene sulfonic acid formaldehyde polymer mixture according to Example 2 instead of 7 g of the aqueous presscake of the nanosize quinacridone/naphthalene sulfonic acid formaldehyde polymer mixture presscake according to Example 1. A violet beta quinacridone pigment of similar good pigment properties is obtained.

EXAMPLE 10

The procedure of Example 8 is repeated, but using 4 g of the aqueous presscake of the nanosize 2,9-dimethoxy quinacridone/naphthalene sulfonic acid formaldehyde polymer mixture according to Example 3 instead of 7 g of the aqueous presscake of the nanosize quinacridone/naphthalene sulfonic acid formaldehyde polymer mixture presscake according to Example 1. A violet beta quinacridone pigment of similar good pigment properties is obtained.

EXAMPLE 11

The procedure of Example 8 is repeated, but using 4 g of the aqueous presscake of the nanosize 2,9-dichloro quinacridone/naphthalene sulfonic acid formaldehyde polymer mixture according to Example 4 instead of 7 g of the aqueous presscake of the nanosize quinacridone/naphthalene sulfonic acid formaldehyde polymer mixture presscake according to Example 1. A violet beta quinacridone pigment of similar good pigment properties is obtained.

EXAMPLE 12

A one liter flask equipped with a thermometer, stirrer and condenser is charged with 50 g 6,13-dihydroquinacridone, 200 ml methanol and 5 g of the aqueous presscake of the nanosize quinacridone/naphthalene sulfonic acid formaldehyde polymer mixture according to Example 1 are stirred at 20–27° C. for 10 minutes. 50 g 50% aqueous sodium hydroxide are added. The mixture is stirred under a slow flow of nitrogen at 50–53° C. for one hour. 0.9 g anthraquinone-2,7-disulfonic acid disodium salt as catalyst is added and the reaction mixture is heated to reflux for 5 minutes. 77 g of an aqueous 19.1% by weight hydrogen peroxide solution are added into the reaction mixture with a peristaltic pump at a pumping rate of 0.4 ml/minute, whereby after 15 minutes addition time 1.6 g phthalimidomethyl-quinacridone are introduced into the reaction mixture followed by continuing the hydrogen peroxide addition while maintaining reflux and a slow nitrogen flow. The resulting red suspension is further stirred for 10 minutes at reflux then diluted with 100 ml cold water and filtered. The presscake is washed with hot water then dried, yielding a red quinacridone. The X-ray shows the diffraction pattern of a gamma quinacridone. The pigment shows outstanding pigment properties and can be applied for the red coloration of paints, inks and plastics.

EXAMPLE 13

63.0 g of polyvinyl chloride, 3.0 g epoxidized soy bean oil, 2.0 g of barium/cadmium heat stabilizer, 32.0 g dioctyl phthalate and 1.0 g of the violet beta quinacridone pigment according to Example 7 are mixed together in a glass beaker using a stirring rod. The mixture is formed into a soft PVC sheet with a thickness of about 0.4 mm by rolling for 8 minutes on a two roll laboratory mill at a temperature of 160° C., a roller speed of 25 rpm and friction of 1:1.2, by constant folding, removal and feeding. The resulting soft PVC sheet is colored in an attractive violet shade and has excellent fastness to heat, light and migration.

EXAMPLE 14

5 g of the violet beta quinacridone pigment according to Example 8, 2.65 g Chimassorb® 944LD (hindered amine light stabilizer), 1.0 g Tinuvin® 328 (benzotriazole UV absorber) and 2.0 g Irganox® B-215 Blend (anti-oxidant, all from Ciba Specialty Chemicals Corporation), are mixed together with 1000 g of high density polyethylene at a speed of 175–200 rpm for 30 seconds after flux. The fluxed, pigmented resin is chopped up while warm and malleable, and then fed through a granulator. The resulting granules are molded on an injection molder with a 5 minute dwell time and a 30 second cycle time at a temperature of 200, 250 and 300° C. Homogeneously colored chips, which show a violet color with practically no color differences, are obtained. They have an excellent light stability.

EXAMPLE 15

This Example illustrates the incorporation of the inventive beta quinacridone according to Example 8 into an automotive paint system.

Millbase Formulation

A pint jar is charged with 30.9 g acrylic resin, 16.4 g AB dispersant consisting of 45% of an acrylic resin in toluene, and 42.8 g solvent (Solvesso® 100, American Chemical). 30.0 g beta quinacridone according to Example 8 and 980 g of 4 mm diameter steel diagonal rods are added. The mixture in the jar is shaken on a Skandex shaker for 5 hours. The millbase contains 25.0% pigment with a pigment/binder ratio of 0.5.

Masstone Color 48.9 g of the above millbase, 71.7 g of a clear 47.8% solids unpigmented resin solvent solution containing a melamine resin catalyst, a non-aqueous dispersion resin and a UV absorber, and 29.4 g of a clear unpigmented 58% solids unpigmented polyester urethane resin solvent solution, are mixed and diluted with a solvent mixture comprising 76 parts xylene, 21 parts butanol and 3 parts methanol to a spray viscosity of 20–22 seconds as measured by a #2 Fisher Cup.

The resin/pigment dispersion is sprayed onto a panel twice at 1½ minute intervals as basecoat. After 2 minutes, the clearcoat resin is sprayed twice at 1½ minute intervals onto the basecoat. The sprayed panel is then flashed with air in a flash cabinet for 10 minutes and then "baked" in an oven at 129° C. for 30 minutes, yielding a violet colored panel. The coated panel has excellent weatherability.

EXAMPLE 16

1000 g of polypropylene granules (Daplen PT-55®, Chemie Linz) and 10 g of the gamma quinacridone pigment according to Example 12 are thoroughly mixed in a mixing drum. The granules so obtained are melt spun at 260–285° C. to red filaments of good light fastness and textile fiber properties.

EXAMPLE 17

1000 g of polypropylene granules (Daplen PT-55®, Chemie Linz) and 10 g of the beta quinacridone pigment according to Example 9 are thoroughly mixed in a mixing drum. The granules so obtained are melt spun at 260–285° C. to violet filaments of good light fastness and textile fiber properties.

What is claimed is:

1. A composition comprising from 50 to 99% by weight of an organic pigment having an average particle size of from 1 to 100 nm and from 1 to 50% by weight of a naphthalene sulfonic acid formaldehyde polymer of molecular weight from 400 to 10000, wherein the polymer has formula

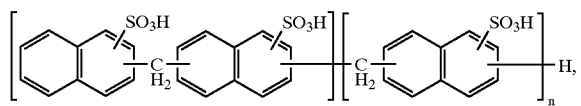

(II)

wherein n is a number from 0 to 12, comprising additionally from 0.01 to 10% by weight, based on the pigment, of a pigment derivative of the formula

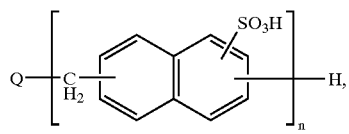

(III)

wherein n is 1 or 2 and Q is a radical obtained by deprotonation of said pigment.

2. A process for the preparation of a composition comprising an organic pigment having an average particle size of from 1 to 100 nm, comprising dissolving said pigment in a mineral acid, adding or preparing in the presence of said pigment in the mineral acid a naphthalene sulfonic acid formaldehyde polymer, and precipitating the composition by drowning said pigment and said naphthalene sulfonic acid formaldehyde polymer together into an aqueous liquid.

3. A process of claim 2, wherein the mineral acid is sulphuric acid or phosphoric acid.

4. A process of claim 2, wherein the naphthalene sulfonic acid formaldehyde polymer is added before or after the pigment is dissolved in the mineral acid.

5. A process of claim 2, wherein the naphthalene sulfonic acid polymer is synthesized in the mineral acid in the presence of the pigment.

6. A process according to claim 2, wherein
a) the pigment is dissolved in concentrated sulfuric acid at a temperature below 65° C.;
b) the naphthalene sulfonic acid is added into the solution in step a) and dissolved at a temperature from about 35 to about 50° C.;
c) paraformaldehyde is then added at a temperature from 35 to 55° C.;
d) the mixture from step c) is heated to about 50 to 90° C. for 30 minutes to 6 hours;
e) the mixture from step d) is drowned into a mixture of ice and water or into water at a temperature below 40° C., to provide a precipitate and
f) said precipitate is isolated.

7. A process according to claim 2, wherein the molar ratio of the pigment: naphthalene sulfonic acid: formaldehyde is 1:1–1.2:1–2.

8. A process according to claim 2, wherein the pigment is selected from the group consisting of azo, azomethine, methine, anthraquinone, phthalocyanine, perinone, perylene, diketopyrrolopyrrole, thioindigo, thiazinindigo, dioxazine, iminoisoindoline, iminoisoindolinone, quinacridone, flavanthrone, indanthrone, anthrapyrimidine and quinophthalone pigments, and mixtures and solid solutions thereof.

9. A process according to claim 8, wherein from 0.01 to 10% by weight, based on the pigment, of a pigment derivative of the formula

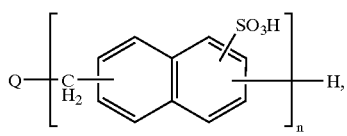

(III)

wherein n is 1 or 2 and Q is a radical obtained by deprotonation of said pigment, is additionally obtained.

10. A process according to claim 8, wherein the pigment is selected from the group consisting of dioxazine, diketopyrrolopyrrole, quinacridone, phthalocyanine, indanthrone and iminoisoindolinone pigments, and mixtures and solid solutions thereof.

11. A process for the preparation of an anthraquinone, phthalocyanine, perinone, perylene, diketopyrrolopyrrole, thioindigo, thiazinindigo, iminoisoindoline, iminoisoindolinone, quinacridone, flavanthrone, dioxazine, indanthrone, anthrapyrimidine or quinophthalone pigment or a solid solution thereof wherein said pigment is prepared in the presence of up to 25% by weight based on the weight of pigment prepared of a composition comprising from 50 to 99% by weight of an organic pigment having an average particle size of from 1 to 100 nm and from 1 to 50% by weight of a naphthalene sulfonic acid formaldehyde polymer of molecular weight from 400 to 10000.

12. A process according to claim 11, wherein the pigment is diketopyrrolopyrrole or quinacridone pigment or a solid solution thereof.

13. A process according to claim 12, wherein the pigment is quinacridone, 2,9-dichloroquinacridone, 4,11-dichloroquinacridone, 2,9-dimethylquinacridone, 2,9-dimethoxyquinacridone pigment or solid solutions thereof.

* * * * *